(12) United States Patent
Yu et al.

(10) Patent No.: US 7,347,635 B2
(45) Date of Patent: Mar. 25, 2008

(54) OPTICAL TRANSCEIVER

(75) Inventors: Juhyun Yu, Hitachi (JP); Kinya Yamazaki, Hitachi (JP); Hidetaka Kawauchi, Hitachi (JP); Tenpei Inoue, Hitachi (JP); Hiroki Katayama, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/156,631

(22) Filed: Jun. 21, 2005

(65) Prior Publication Data

US 2006/0140551 A1 Jun. 29, 2006

(30) Foreign Application Priority Data

Dec. 28, 2004 (JP) ............................. 2004-379588

(51) Int. Cl.
*G02B 6/36* (2006.01)
(52) U.S. Cl. ..................... 385/92; 385/88; 385/93; 385/94
(58) Field of Classification Search ............. 385/92–94
See application file for complete search history.

(56) References Cited

U.S. PATENT DOCUMENTS

| | | | |
|---|---|---|---|
| 6,767,143 B2 * | 7/2004 | Huang ........................ 385/92 |
| 6,863,451 B2 * | 3/2005 | Kurashima et al. ........... 385/92 |
| 7,207,730 B2 * | 4/2007 | Huang et al. .................. 385/92 |
| 2003/0043055 A1 * | 3/2003 | Schultz et al. ........... 340/856.3 |
| 2003/0198445 A1 * | 10/2003 | Inujima et al. ................ 385/92 |
| 2004/0105633 A1 * | 6/2004 | Ishikawa et al. .............. 385/92 |
| 2004/0197056 A1 * | 10/2004 | Oki ............................. 385/92 |
| 2004/0208602 A1 * | 10/2004 | Plante ........................ 398/140 |
| 2005/0036747 A1 * | 2/2005 | Togami et al. ................. 385/92 |
| 2005/0058406 A1 * | 3/2005 | Reilly et al. .................. 385/88 |
| 2005/0158052 A1 * | 7/2005 | Larson ........................ 398/135 |
| 2005/0232555 A1 * | 10/2005 | Rosenberg ................... 385/88 |
| 2005/0242969 A1 * | 11/2005 | Deutsch et al. ........ 340/815.45 |
| 2005/0286839 A1 * | 12/2005 | Yoshikawa ................... 385/92 |
| 2006/0024005 A1 * | 2/2006 | Ice et al. ...................... 385/92 |
| 2007/0047882 A1 * | 3/2007 | Ice ............................... 385/92 |
| 2007/0104427 A1 * | 5/2007 | Shaw et al. ................... 385/89 |
| 2007/0140625 A1 * | 6/2007 | Chen et al. ................... 385/88 |

FOREIGN PATENT DOCUMENTS

JP 2004-103743 A 4/2004

\* cited by examiner

*Primary Examiner*—Michelle Connelly-Cushwa
*Assistant Examiner*—Rhonda S. Peace
(74) *Attorney, Agent, or Firm*—Foley & Lardner LLP (57) ABSTRACT

An optical transceiver has: an optical subassembly that has a built-in chip portion and a receptacle portion; a board electrically connected to one end of the built-in chip portion; a housing that houses the optical subassembly and the board; and a holding member to hold the optical subassembly.

21 Claims, 6 Drawing Sheets

OPTICAL TRANSCEIVER

The present application is based on Japanese patent application No. 2004-379588, the entire contents of which are incorporated herein by reference.

BACKGROUND OF THE INVENTION

1. Field of the Invention

This invention relates to an optical transceiver with an optical subassembly and, in particular, to an optical transceiver that allows an improvement in assembly workability, a reduction in assembly failure and an enhancement in heat radiation performance.

2. Description of the Related Art

An optical transceiver for optical communications includes an optical transmission module and an optical reception module which are placed in a housing. The optical transmission module and the optical reception module are similar in mechanical structure except that its electrical function is reversed between transmission and reception. In detail, the optical transmission/reception module is composed of a package with a light-emitting element or a light-receiving element (hereinafter called optical element) placed therein and an optical system such as a lens tube. The package may include a peltiert element for cooling the optical element. The optical element and the peltiert element are formed as a semiconductor chip and, therefore, hereinafter collectively called chip. The housing is provided with a window through which one end of an optical fiber as a transmission line is inserted. In the window, a receptacle is disposed to accurately place the optical fiber in the optical path. Although the receptacle is a simple tube, it is an important component to define the optical path toward the optical element in its inside space. By previously uniting the receptacle with the optical transmission/reception module, the assembly process of an optical transceiver can be simplified. Hereinafter, such united components are called optical subassembly.

Figure 1:
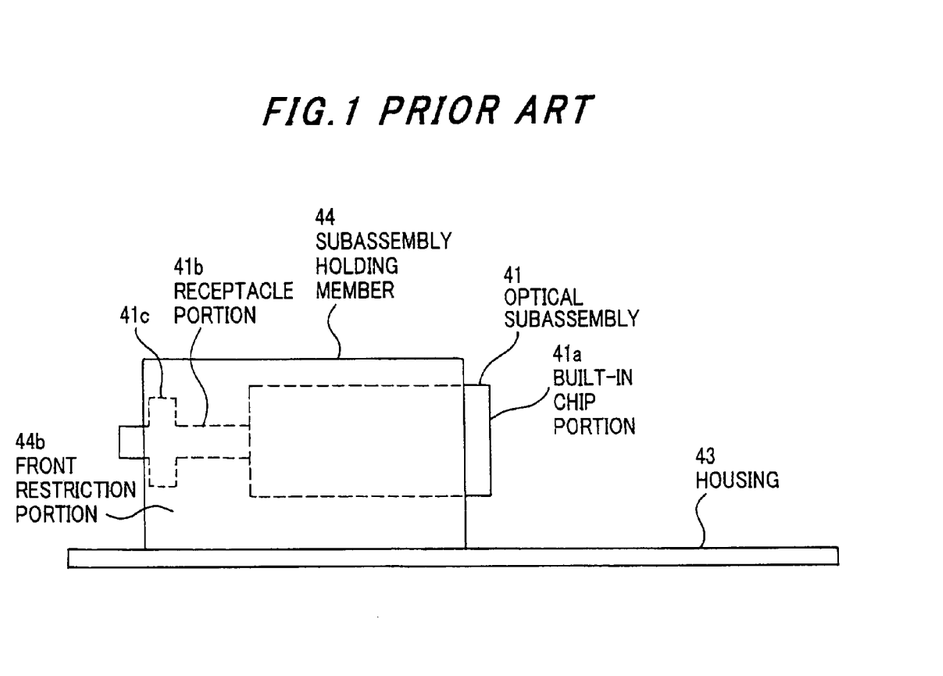
FIG. 1 is a side cross sectional view showing the conventional optical subassembly.

As shown in FIG. 1, a conventional optical subassembly 41 is constructed by uniting a cylindrical built-in chip portion 41a with a chip for light transmission/reception built therein with a receptacle portion 41b protruding from one end of the built-in chip portion 41a to define the optical path. In order to position and secure the optical subassembly 41 into a housing 43 (partly shown in FIG. 1), a subassembly holding member 44 is used. The subassembly holding member 44 is integrally provided with a front restriction portion 44b with a hole into which the receptacle portion 41b and a base (not shown) on which the built-in chip portion 41a is mounted. The receptacle portion 41b has a flange 41c formed midway with a large diameter. The hole of the subassembly holding member 44 is provided with a groove into which the flange 41c is fitted. Thus, the optical subassembly 41 is positioned and secured by the subassembly holding member 44. Meanwhile, the form of the base is detailed in Japanese patent application laid-open No. 2004-103743. The base is provided with a roundly-recessed receiving portion so as to surely receive the cylindrical built-in chip portion 41a. Alternatively, the other subassembly holding member 44 may be composed of only the front restriction portion 44b without having the base. This type is as shown in FIGS. 2 and 3.

In the structure as shown in FIG. 1, the bottom face of the subassembly holding member 44 is located lower than the bottom face of the optical subassembly 41. This structure is based on the concept that the optical subassembly 41 is held by the subassembly holding member 44 and the subassembly holding member 44 is secured to the housing 43. The optical subassembly 41 is not directly in contact with the housing 43.

On the other hand, the optical subassembly 41 is provided with leads (not shown) electrically connected to electrodes of the chip and exposed at the other end on the side of the built-in chip portion 41a. The leads are soldered to a board (not shown) to interconnect each other.

Figure 2:
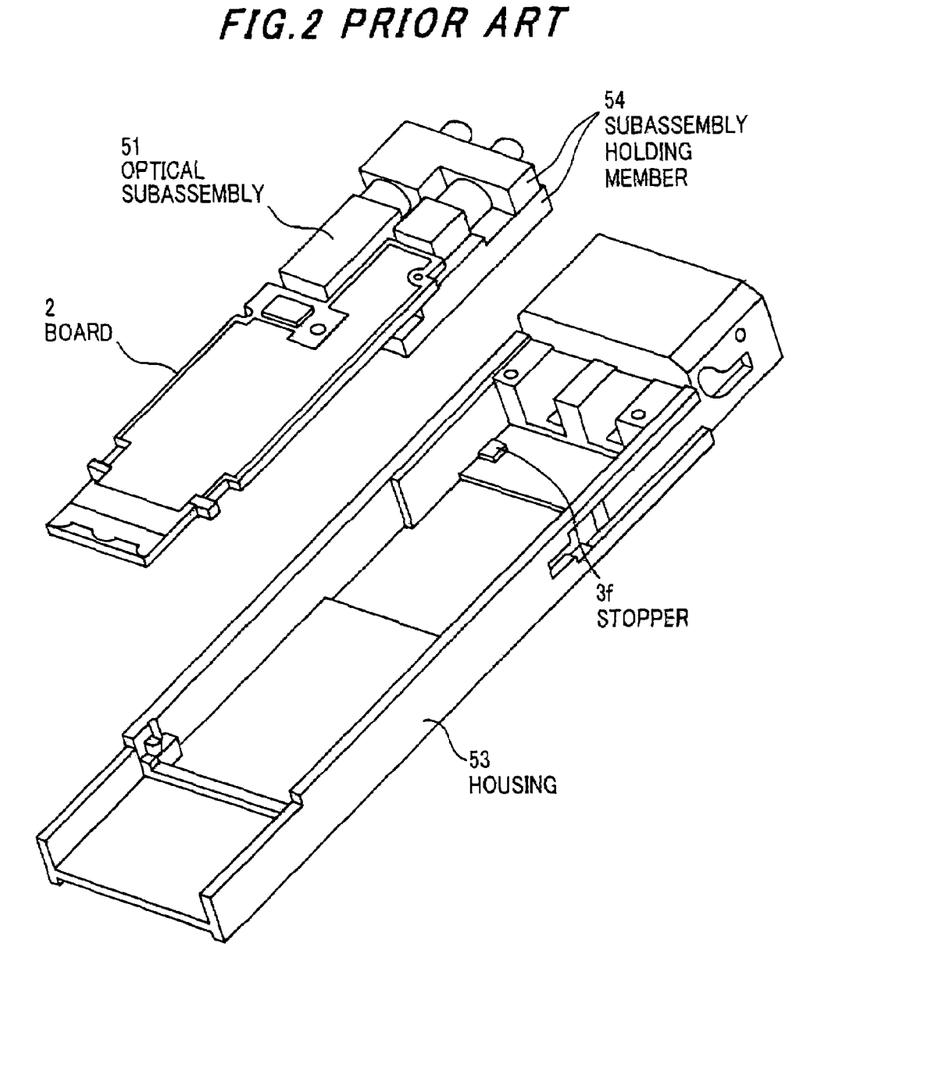
FIG. 2 is a broken perspective view showing the conventional optical transceiver.
Figure 3:
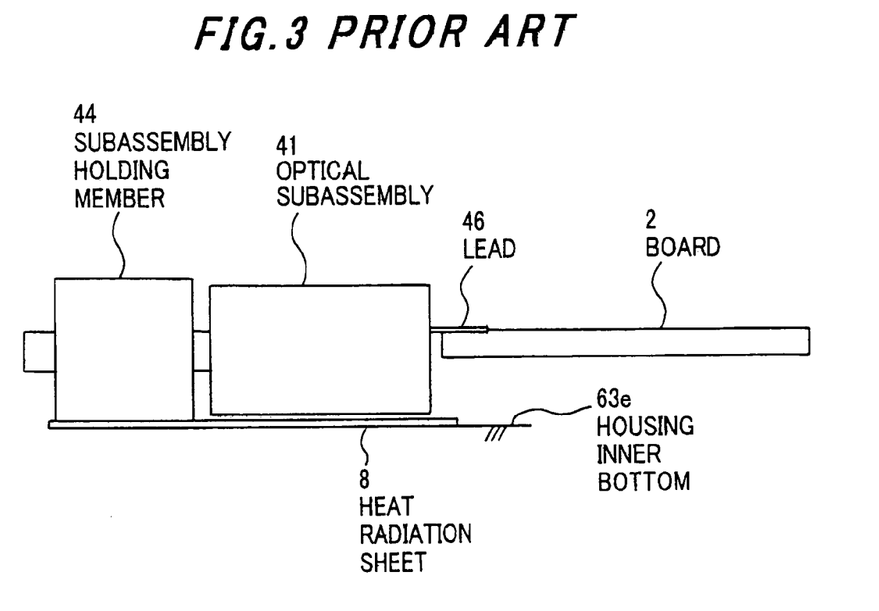
FIG. 3 is a side cross sectional view showing the conventional optical subassembly with a heat radiation sheet.

The process of assembling the optical receiver is conducted such that, as shown in FIG. 2, a board 2 is previously connected to an optical subassembly 51, a subassembly holding member 54 is attached into the optical subassembly 51, and these are installed in a housing 53. The subassembly holding member 54 is vertically divided into two parts which can hold the optical subassembly 51 while sandwiching the receptacle portion.

As seen from the above assembly process, the optical subassembly 51 and the board 2 are in integration form installed into the housing 53. However, the optical subassembly 51 and the board 2 are connected only by soldering leads for electrical connection to electrodes on the board 2, and, thus, the optical subassembly 51 and the board 2 are not integrated rigidly. In addition, the optical subassembly 51 elongates in a direction away from the lead because of having the receptacle portion, and the board 2 also elongates in the opposite direction. Therefore, when the optical subassembly 51 and the board 2 are in integration form transported to be installed into the housing 53, both of them are kept unstable. It is apparent that strain force caused by a vibration or weight balance during all that time will concentrate on the soldered portion.

The strain force may cause the breaking of leads or the assembly failure and, therefore, the product yield of the optical transceiver will lower. Further, even if such a visible failure is not generated, when the lead or solder has a crack or the chip in the built-in chip portion is subjected to an unnecessary strain force, the reliability will lower due to a failure in the communication and durability performance.

On the other hand, since in high-speed and large-capacity communications, the chip has an increase in consumed power and thereby has an increase in heat generation, a heat radiation member is needed that can efficiently discharge heat from the optical subassembly to the housing. Thus, as shown in FIG. 3, the subassembly holding member 44 is not directly in contact with a bottom 63e in the housing and a heat radiation sheet 8 is disposed between the subassembly holding member 44 and the bottom 63e.

The optical subassembly 41 is not in close contact with the heat radiation sheet 8 since it has a gap in bottom level relative to the subassembly holding member 44. However, since the heat radiation sheet 8 has a finite thickness and some elasticity, when the subassembly holding member 44 and the optical subassembly 41 are pressed down by a lid (not shown) of the housing or by an upper base opposite to the lower base, the optical subassembly 41 becomes in close contact with the heat radiation sheet 8 while the heat radiation sheet 8 under the subassembly holding member 44 is crushed. Thus, depending on the balance of press-down force, the entire housing or the subassembly holding member 44 or optical subassembly 41 is subjected to a strain force. The strain force is applied to the connection part of the lead 46 and the board 2 and thus concentrates on the soldered portion.

Further, the force is also applied to the optical element or optical system in the optical subassembly 41. Therefore, the optical output may decrease due to a deviation in the optical axis. As a result, the reliability lowers.

SUMMARY OF THE INVENTION

It is an object of the invention to provide an optical transceiver that allows an improvement in assembly workability, a reduction in assembly failure and an enhancement in heat radiation performance.

According to one aspect of the invention, an optical transceiver comprises:

a built-in chip portion that comprises a chip for light transmission and reception;

a receptacle portion that extends from one end of the built-in chip portion and defines an optical path;

an optical subassembly that comprises the built-in chip portion and the receptacle portion that are united each other;

a board electrically connected to the opposite end of the built-in chip portion;

a housing that houses the optical subassembly and the board; and a holding member that comprises a front rib comprising a groove into which the receptacle portion is fitted, a back rib to which the board is secured, and a side rib that links the front rib and the back rib, wherein the holding member holds the optical subassembly.

It is preferred that the housing comprises a front restriction portion to restrict a forward movement of the front rib in a direction of an axis of the optical path, and a back restriction portion to restrict a backward movement of the back rib in the direction of the axis of the optical path.

It is preferred that the housing further comprises a heat radiation sheet disposed on a predetermined inside face of the housing, the optical subassembly comprises a predetermined face that is at the same level as an outside face of the holding member or protrudes from the outside face of the holding member, and the predetermined face of the optical subassembly is in contact with the heat radiation sheet.

It is preferred that the housing further comprises a stopper to restrict the optical subassembly not to shift in excess of a predetermined distance.

It is preferred that the optical transceiver further comprises: a shield member that is disposed between the front restriction portion of the housing and the front rib of the holding member, wherein the shield member comprises an elasticity.

It is preferred that the optical subassembly is connected through a lead to the board, and the lead has a shift quantity of ±0.1 mm or less in a direction of a thickness of the heat radiation sheet between a reference position of the lead expected when the optical subassembly is at a reference position and a position of the lead in a mounted state where the optical subassembly, the board and the holding member are mounted on the housing, wherein the reference position of the optical subassembly is defined as a position that the optical subassembly is mounted shifting a predetermined distance in a direction that the heat radiation sheet is compressed from its original thickness.

According to another aspect of the invention, an optical transceiver comprises:

an optical subassembly that comprises a built-in chip portion and a receptacle portion;

a board electrically connected to one end of the built-in chip portion;

a housing that houses the optical subassembly and the board; and a holding member to hold the optical subassembly.

It is preferred that the holding member that comprises a front rib comprising a groove into which the receptacle portion is fitted, and a back rib to which the board is secured, and the housing comprises a front restriction portion to restrict a forward movement of the front rib in a longitudinal direction of the optical transceiver, and a back restriction portion to restrict a backward movement of the back rib in the longitudinal direction of the optical transceiver.

ADVANTAGES OF THE INVENTION

Since the board is secured to the holding member to hold the optical subassembly, the optical transceiver can have a significant improvement in assembly failure.

Also, since strain force is prevented from being applied to the optical subassembly or the like, the optical transceiver of the invention can have an enhanced reliability.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Composition of Optical Transceiver

Figure 4A:
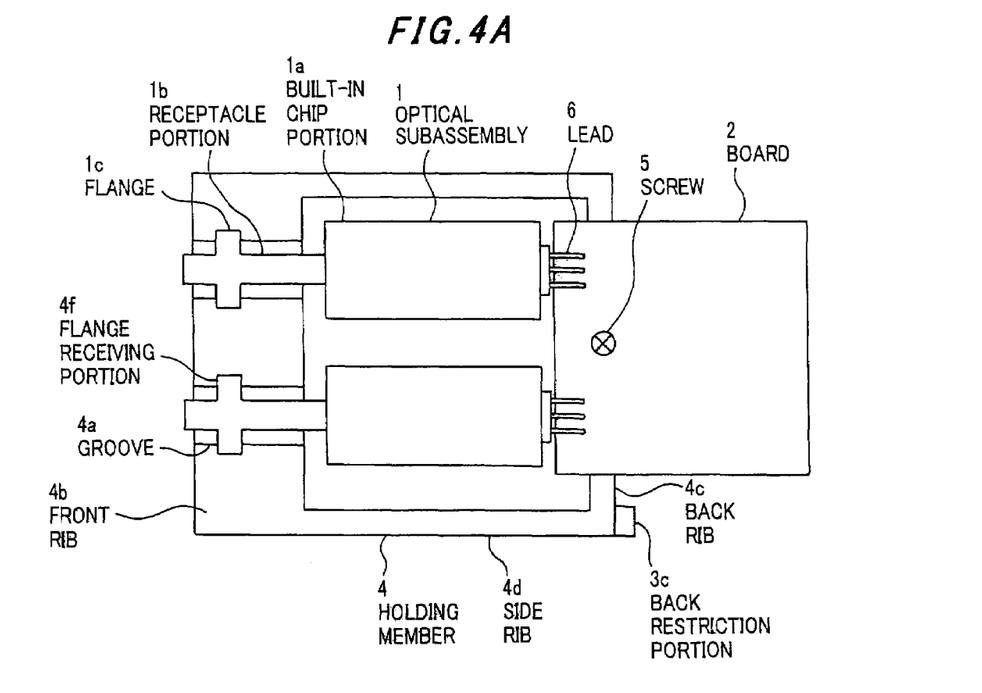
FIG. 4A is a top view showing an optical transceiver in a preferred embodiment according to the invention, where a housing is omitted.
Figure 4B:
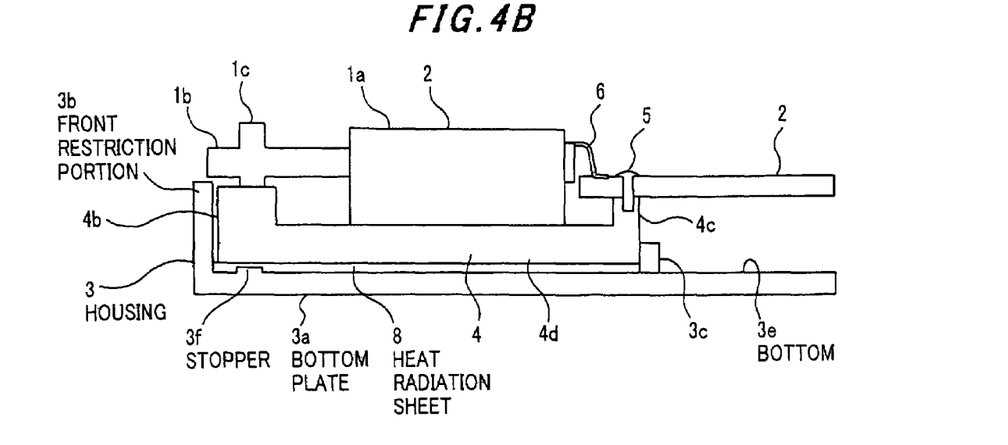
FIG. 4B is a side cross sectional view showing the optical transceiver in FIG. 4A, where the housing is shown.

As shown in FIGS. 4A and 4B, an optical transceiver in the preferred embodiment according to the invention is composed of: a built-in chip portion 1a where a chip for optical transmission and reception is built in; a receptacle portion 1b composing an optical path extended from one end of the built-in chip portion 1a; an optical subassembly 1 in which the built-in chip portion 1a and the receptacle portion 1b are integrated; a board 2 electrically connected to the other end of the optical subassembly 1; a housing 3 in which the optical subassembly 1 and the board 2 are placed; and a holding member 4 which is composed of a front rib 4b with a groove 4a into which the receptacle portion 1b is fitted, a back rib 4c to which the board 2 is fixed, and a side rib 4d through which the front rib 4b and the back rib 4c are linked, wherein the ribs 4b, 4c and 4d are integrally formed.

The holding member 4 is formed such that both ends of the front rib 4b each are linked with both ends of the back rib 4c through the two side ribs 4d, and these four ribs form a rectangular frame, and an inside region surrounded by the frame corresponds to a space for housing the built-in chip portion 1a. Alternatively, three of the four ribs may form an arm structure, i.e., a frame structure with one side opened.

Since the receptacle portion 1b has a flange 1c formed midway, the groove 4a of the front rib 4b has a flange receiving portion 4f with a large diameter to receive the flange 1c. In FIG. 4B, the height of the front rib 4b is shown such that it does not reach the bottom of the receptacle portion 1b. This is because other half (not shown) of the front rib 4b, which is divided into two parts, is later laid on the front rib 4b (See the subassembly holding member 54 in FIG. 2).

The upper face of the back rib 4c is flattened, and the board 2 is mounted thereon and secured through a screw 5 to the back rib 4c.

The housing 3 is composed of a bottom plate 3a which composes an outer shell of the housing 3, a side plate (not shown), and an upper plate (not shown) which closes up the upper part of the housing 3. The housing 3 is provided with a wall-shaped front restriction portion 3b to restrict the forward movement of the front rib 4b in the optical axis direction, and a back restriction portion 3c, which is shaped like a protrusion rising from the bottom plate 3a, to restrict the backward movement of the back rib 4c in the optical axis direction. The number and location of the back restriction portion 3c are not limited if the backward movement of the back rib 4c in the optical axis direction can be restricted.

The housing 3 is provided with a stopper 3f which is formed on its bottom 3e and protrudes upward. The stopper 3f is located below the front rib 4b of the holding member 4.

The optical subassembly 1 is electrically connected to the board 2 by soldering a lead 6 to the board 2 as described in the related art. Although in FIG. 4B the lead 6 is lead-formed, it can be soldered to the board 2 without being lead-formed when the height of the lead 6 protruding from the optical subassembly 1 corresponds to that of the board 2.

Process of Assembling the Optical Transceiver

Next, the process of assembling the optical transceiver of the invention will be explained.

Figure 5:
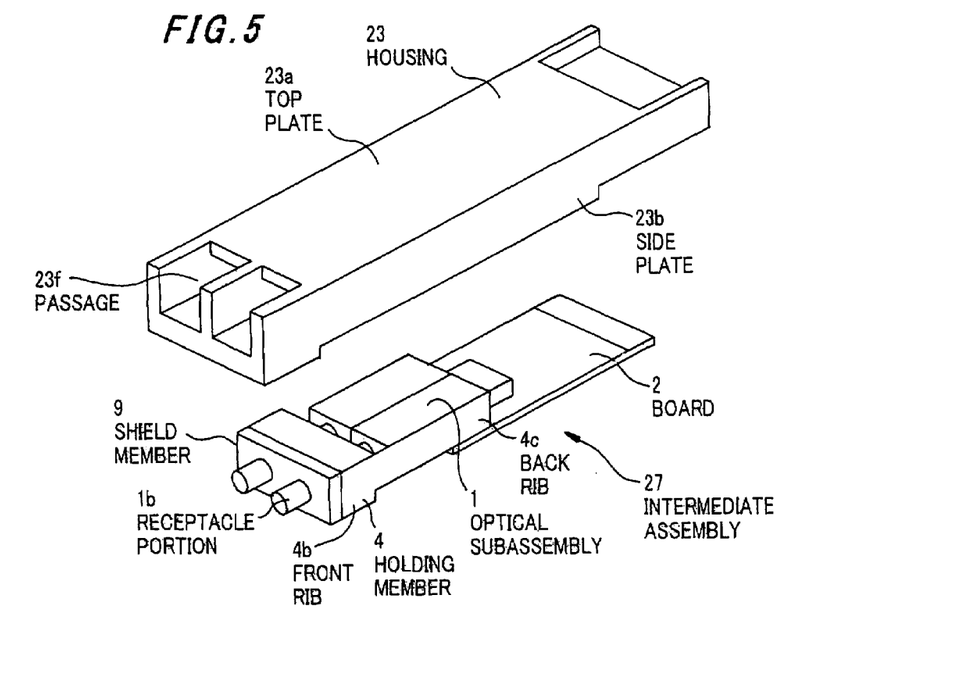
FIG. 5 is a broken perspective view showing the optical transceiver in the preferred embodiment according to the invention.

FIG. 5 is a broken perspective view showing the optical transceiver in the preferred embodiment according to the invention. In FIG. 5, the optical transceiver is assembled such that, into a housing 23 constructed by a top plate 23a and a side plate 23b while having no bottom plate, components such as the optical subassembly 1 are attached from the opened bottom side, and then the housing 23 is closed up by a bottom plate (not shown). Although the optical transceiver in FIG. 5 is disposed shown upside down in relation to that in FIGS. 4A and 4B, the former is equivalent to the latter in terms of the invention.

Explaining in sequential order, the receptacle portion 1b is fitted into the front rib 4b, and other half (not shown) of the front rib 4b is laid on the front rib 4b to fix the optical subassembly 1 by the holding member 4. Then, the board 2 is disposed on the back rib 4c and secured through the screw (not shown) to the back rib 4c. Thus, the optical subassembly 1 and the board 2 are fixed to the holding member 4. Then, the lead protruding from the optical subassembly 1 (See FIG. 4B, though not shown in FIG. 5) is soldered to the board 2. This is called an intermediate assembly 27.

Then, the intermediate assembly 27 assembled is moved and attached into the housing 23. The housing 23 is provided with the front restriction portion to restrict the forward movement of the front rib 4b in the optical axis direction, and the back restriction portion to restrict the backward movement of the back rib 4c in the optical axis direction (in FIG. 5, the back restriction portion protrudes inside the housing 23 downward from the top plate 23a, though not shown). Therefore, the intermediate assembly 27 is sandwiched by the front restriction portion and the back restriction portion. Then, the housing 23 is closed up by the bottom plate (not shown).

As seen from the above assembly process, the optical subassembly 1 and the board 2 are attached into the housing 23 after they are securely united as the intermediate assembly 27. Therefore, during the process that the intermediate assembly 27 is moved and attached into the housing 23, strain force caused by vibration or weight balance does not concentrate on the soldered portion. Thus, the production yield can be improved since the breaking of lead is not generated. Furthermore, the lead or solder generates no crack and a chip in the built-in chip portion is not subjected to an unnecessary strain force. Accordingly, the reliability can be enhanced while keeping the communication and durability performance.

Heat Radiation Sheet 8

Next, the installation of a heat radiation sheet 8 will be explained.

Figure 6:
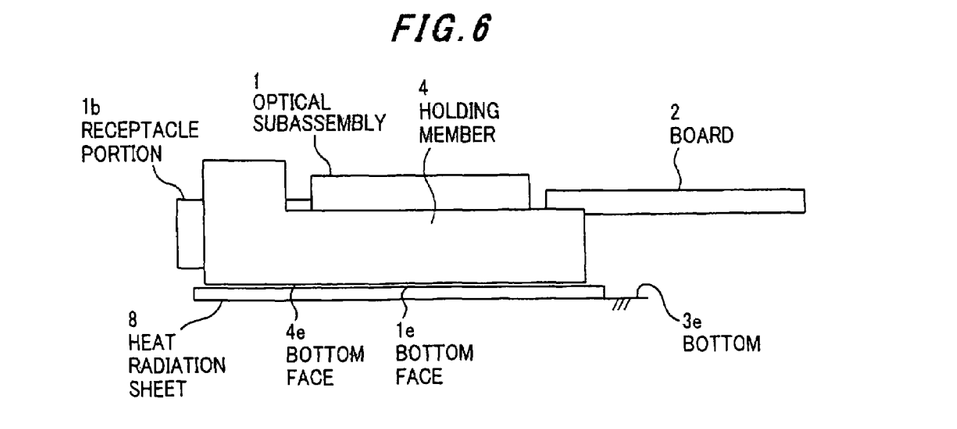
FIG. 6 is a side cross sectional view showing optical transceiver in the preferred embodiment according to the invention.

As shown in FIG. 4B, the heat radiation sheet 8 is laid on the bottom 3e of the housing 3. In this case, as shown in FIG. 6, the bottom face 1e of the optical subassembly 1 is disposed lower than the bottom face 4e of the holding member 4. In order to realize this, the depth of the groove 4a of the front rib 4b to position and hold the flange 1c of the receptacle portion 1b can be determined. Thus, by bringing the height of the receptacle portion 1b to a predetermined position of the holding member 4, the bottom face 1e of the optical subassembly 1 can be disposed to be on the same level as or lower than the bottom face 4e which is the outer surface of the holding member 4. As a result, the bottom face 1e of the optical subassembly 1 can be in contact with the heat radiation sheet 8. Since the inside bottom of the housing 3 is located below the heat radiation sheet 8, the clearance between the bottom face 4e of the holding member 4 and the inside bottom of the housing 3 is the same as or larger than the clearance between the bottom face 1e of the optical subassembly 1 and the inside bottom of the housing 3.

Comparing this with the case in FIG. 3, the case in FIG. 6 is such that, when the holding member 4 or the optical subassembly 1 is pressed down by the top plate (not shown) of the housing 3, the bottom face 1e of the optical subassembly 1 protrudes slightly downward from the bottom face 4e of the holding member 4. On the other hand, the stopper 3f (See FIG. 2) is formed on the bottom 3e of the housing 3. The positional relationship will be detailed referring to FIGS. 7A and 7B.

Figure 7A:
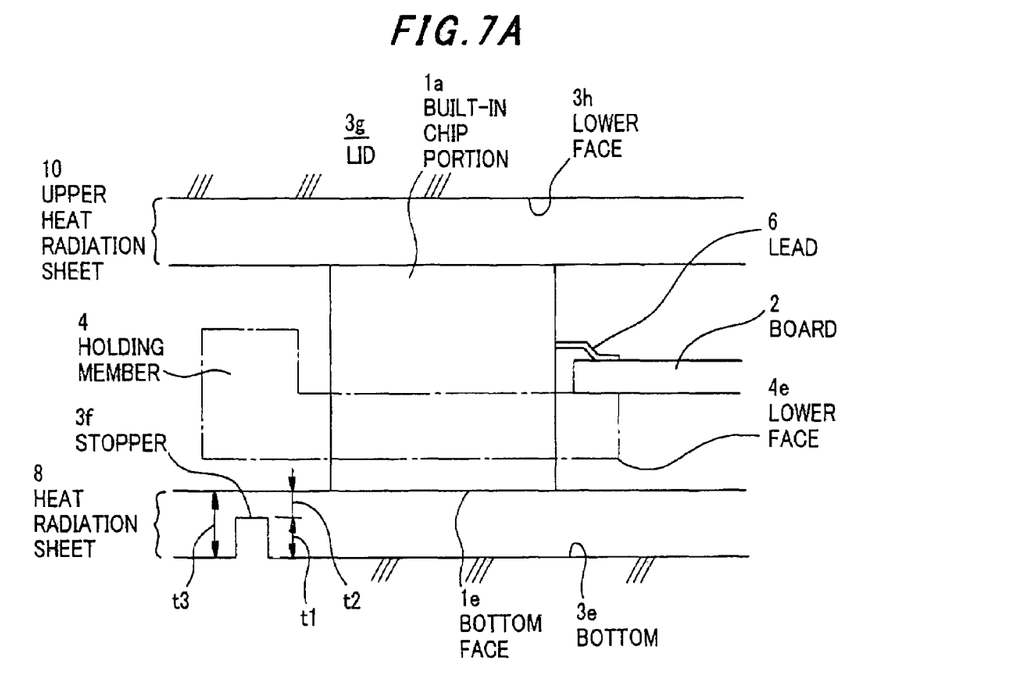
FIG. 7A is a side cross sectional view showing part of the optical transceiver in the preferred embodiment according to the invention, where a region occupied by an optical subassembly in a housing of the optical transceiver is shown in the vertical direction.

As shown in FIG. 7A, between the lower face 3h of a lid 3g of the housing 3 and the bottom 3e, an upper heat radiation sheet 10, the built-in chip portion 1a and the heat radiation sheet 8 are stacked contacting each other. Although the upper heat radiation sheet 10 is not explained thus far, it is a heat radiation member to efficiently radiate heat from the optical subassembly 1 to the housing 3 in analogy with the heat radiation sheet 8. The holding member 4 is not in contact with the bottom 3e. The board 2 is connected through the lead 6 to the built-in chip portion 1a.

Stopper 3f

Figure 7B:
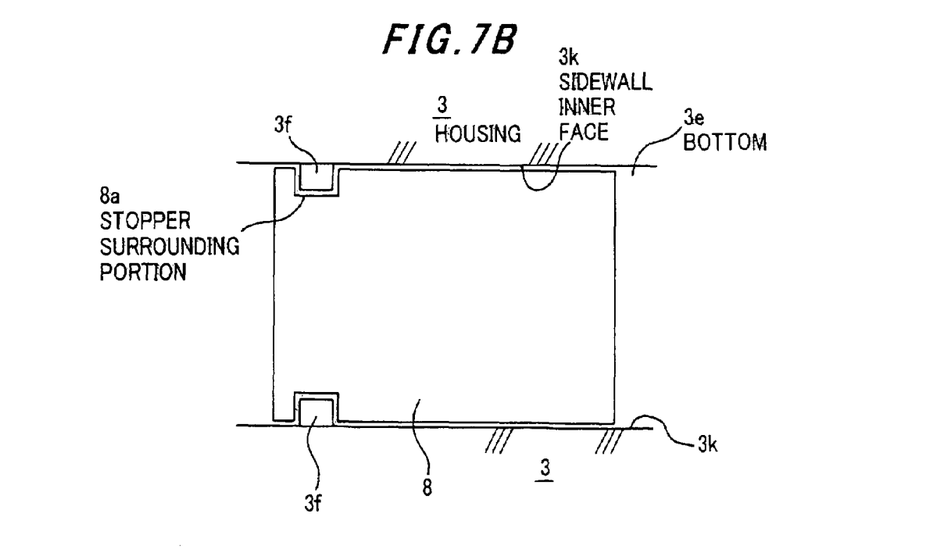
FIG. 7B is a top view showing a heat radiation sheet disposed in the housing.

As shown in FIG. 7B, the stopper 3f is disposed along a sidewall inner face 3k of the housing 3. The heat radiation sheet 8 is provided with a stopper surrounding portion 8a notched so as not to be in contact with the stopper 3f.

In this case, the stopper height (the distance from the bottom 3e to the top face of the stopper 3f) is represented by t1, the stopper clearance (the distance from the bottom 3e to the bottom face 1e of the optical subassembly 1) is represented by t2, the bottom clearance (the distance from the bottom 3e to the bottom face 1e of the optical subassembly 1) is represented by t3, and the top clearance (the distance from the top face of the optical subassembly 1 to the bottom face 3h of the lid 3g) is represented by t4.

For example, the following data are given:

the stopper height t1=0.3 mm, the thickness (natural thickness) of the heat radiation sheet 8=0.5 mm, the target value of the bottom clearance t3=0.4 mm, the target value of the top clearance t4=0.35 mm, and the thickness (natural thickness) of the upper heat radiation sheet 10=0.5 mm.

The heat radiation sheet 8 has a natural thickness (or original thickness) when the heat radiation sheet 8, the optical subassembly 1 and the upper heat radiation sheet 10 are stacked and placed in the housing 3 and the lid 3g is not put on the stack yet. In other words, the natural thickness thereof means one in the state, which is called natural thickness state, that the optical subassembly 1 is put on the heat radiation sheet 8 and the upper heat radiation sheet 10 with a natural thickness is further put on the optical subassembly 1. When the heat radiation sheet 8 has the natural thickness, the bottom clearance t3 is 0.5 mm, which is 0.1 mm greater than the target value, 0.4 mm. Starting from the natural thickness state (i.e., when the heat radiation sheet 8 has the natural thickness of 0.5 mm), the optical subassembly 1 presses down the heat radiation sheet 8 so that the optical subassembly 1 comes to a height position that corresponds to the target value of the bottom clearance t3, 0.4 mm. This position is determined as the reference position of the optical subassembly 1. If, in the real mounting state, the optical subassembly 1 shifts from the reference position, the amount of shift is called shift quantity.

Then, when the lid 3g is put thereon and secured through the screw (not shown) to the housing 3, the optical subassembly 1 is pressed downward through the upper heat radiation sheet 10 so that it shifts downward. Thereby, the heat radiation sheet 8 is compressed due to the downward shift of the optical subassembly 1. When the optical subassembly 1 shifts just 0.1 mm, the bottom clearance t3 comes to 0.4 mm, the target value and the optical subassembly 1 comes to the reference position.

However, in practice, due to the dimensional error of components, the optical subassembly 1 does not always come to the reference position and may shift higher (+ direction) or lower (− direction) than targeted.

In such a case, due to the stopper 3f, the shift quantity of the optical subassembly 1 can be limited.

For example,

T2=(the target value of the bottom clearance t3)−the stopper height t1=0.4 mm−0.3 mm.=0.1 mm.

When the stopper clearance t2 is 0.1 mm, the maximum shift quantity becomes 0.1 mm. Namely, the optical subassembly 1 does not shift more than 0.1 mm. Thus, the shift quantity of the optical subassembly 1 is limited to 0.1 mm or less.

On the other hand, due to the dimensional error of components, only the upper heat radiation sheet 10 may be compressed and the heat radiation sheet 8 may not be compressed. In this case, the optical subassembly 1 shifts 0.1 mm upward from the reference position. In detail, the heat radiation sheet 8 is compressed from the natural thickness, 0.5 mm to the target value, 0.4 mm, of the bottom clearance t3, i.e., 0.1 mm, and the upper heat radiation sheet 10 is compressed from the natural thickness, 0.5 mm to the target value, 0.35 mm, of the top clearance t4, i.e., 0.15 mm. The reason why the heat radiation sheet 8 is not compressed more than 0.1 mm even when the upper heat radiation sheet 10 is compressed 0.15 mm is that there is a difference in material therebetween. Namely, the heat radiation sheet 8 is made of a material harder than that upper heat radiation sheet 10. Further, the heat radiation sheet 8 has a thermal conductivity greater than the upper heat radiation sheet 10. For example, 1.1 kgf/cm$^2$ is needed to compress 0.1 mm the heat radiation sheet 8 while 0.3 kgf/cm$^2$ is needed to compress 0.1 mm the upper heat radiation sheet 10. Thus, due to the difference in hardness between the heat radiation sheet 8 and the upper heat radiation sheet 10, the press-down force of the lid 3g mainly acts on the upper heat radiation sheet 10 to be compressed. Even when the heat radiation sheet 8 is not compressed at all, the optical subassembly 1 is located lower than the case that the upper heat radiation sheet 10 has the natural thickness. Therefore, the optical subassembly 1 can be prevented from shifting more than +0.1 from the reference position.

As shown in FIG. 7B, since the heat radiation sheet 8 is provided with the stopper surrounding portion 8a notched so as not to be in contact with the stopper 3f, the stopper 3f does not contact the heat radiation sheet 8.

The object of the stopper 3f is to limit the shift quantity of the optical subassembly 1. However, as shown in FIG. 7B, the stopper 3f is disposed below the front rib 4b of the holding member 4. This is because, in the optical subassembly 1, a deviation in height direction is generated when aligning the built-in chip portion 1a and the receptacle portion 1b and, therefore, the position of the receptacle portion 1b is determined as the reference position of the optical subassembly 1. Therefore, the stopper 3f is disposed below the front rib 4b not the optical subassembly 1.

The receptacle portion 1b of the optical subassembly 1 is fixed to the holding member 4, and the board 2 is soldered to the lead 6 protruding from the built-in chip portion 1a of the optical subassembly 1 and it is secured through the screw 5 to the holding member 4. Thus, since the optical subassembly 1 is united with the board 2, the board 2 shifts downward as the optical subassembly 1 shifts downward. Therefore, when the shift quantity (i.e., the amount of shifting downward) of the optical subassembly 1 is less than 0.1 mm, the shift quantity of the board 2 is less than 0.1 mm and the shift quantity of the lead 6, which is part of the optical subassembly 1, is also less than 0.1 mm. Due to this mounting structure, stress applied to the lead 6 can be reduced.

In the invention, it is preferred that the shift quantity of the lead 6, i.e., the shift quantity between the reference position of the lead 6 and the mounted position of the lead 6, is less than 0.1 mm when the optical subassembly 1 is in the reference position. Since the components 1a, 1c, 2, 4 and 6 each have a dimensional error, when the optical subassembly 1 or the intermediate assembly 27 (See FIG. 5) is assembled, the optical subassembly 1 or the intermediate assembly 27 may have different dimensions between products. Therefore, when the intermediate assembly 27 is mounted on the housing 3, different shift quantities may be generated in each of the components 1a, 1c, 2, 4 and 6. However, since the shift quantity of the lead 6 is controlled to be less than 0.1 mm in upward and downward directions, the optical transceiver of the invention can have a high reliability in electrical performance.

Shield Member 9

Next, the installation of a shield member 9 will be explained.

As shown in FIG. 5, the shield member 9 is made of a conductive materials, such as metals and conductive resins and includes an elastic material, such as rubbers or an elastic structure such as a spring. The shield member 9 is disposed in front of the front rib 4b of the holding member 4. The shield member 9 is provided with two holes through which the receptacle portion 1b protruding from the front rib 4b passes. In assembling, the receptacle portion 1b is passed through the holes and the shield member 9 is attached onto the front rib 4b. Thereby, the front face of the front rib 4b is entirely covered with the shield member 9 with the exception of the receptacle portion 1b.

As shown in FIG. 5, the housing 23 is provided with rectangular passages 23f through which an optical fiber connector (not shown) is inserted. Although the passage 23f may allow the passing of unnecessary radiation, the electromagnetic shield can be performed as much as possible (although the shielding inside the receptacle portion 1b is impossible) since the front rib 4b is entirely covered with the shield member 9 with the exception of the receptacle portion 1b. Thus, in high-speed and large-capacity communications, the unnecessary radiation from current-carrying parts can be prevented from radiating externally.

Although in FIGS. 4A and 4B the shield member 9 is not shown, the shield member 9 can be disposed between the front restriction portion 3b of the housing 3 and the front rib 4b of the holding member 4. In this case, since the shield member 9 is elastic, the shield member 9 can be in close contact with the front restriction portion 3b of the housing 3. Thereby, the shield effect can be enhanced.

Also, with the holding member 4, the shield member 9 can be easily installed without concentrating force from forward on the lead.

Further, since the shield member 9 is elastic, stress generated can be reduced.

Although in the above embodiment the optical subassembly 1 is secured to the bottom 3e of the housing 3, the optical subassembly 1 may be secured to the top face or side face of the housing 3. In such a case, the heat radiation sheet 8 may be disposed on the top face or side face of the housing 3 so as to be in contact with the top face or side face of the optical subassembly 1. Thereby, the same effects as in the embodiment can be obtained.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical transceiver, comprising:
an optical subassembly that comprises:
  (i) a built-in chip portion that comprises a chip for light transmission and reception; and
  (ii) a receptacle portion that extends from a first end of the built-in chip portion and defines an optical path; wherein the built-in chip portion and the receptacle portion are attached to each other;
a board electrically connected via a lead at an end of the board to a second end of the built-in chip portion that is opposite to the first end of the built-in chip portion;
a housing that houses the optical subassembly and the board; and
a holding member that comprises a front rib comprising a groove into which the receptacle portion is fitted, a back rib to which the board is secured, and a side rib that links the front rib and the back rib;
wherein the holding member includes a bottom face that includes an aperture;
wherein the holding member accommodates and fixes the optical subassembly;
wherein the board and the back rib of the holding member are securely fixed to each other by a fixing member in a vicinity of the end of the board connected to the lead; and
wherein the housing is provided with passages through which an optical fiber connector is inserted.

2. The optical transceiver according to claim 1, wherein:
the aperture of the holding member is larger than the built-in chip portion of the optical subassembly.

3. The optical transceiver according to claim 1, wherein:
the holding member has a frame structure.

4. The optical transceiver according to claim 1, wherein:
the ribs of the holding member form an arm structure with one side opened.

5. An optical transceiver, comprising:
an optical subassembly that comprises:
  (i) a built-in chip portion that comprises a chip for light transmission and reception; and
  (ii) a receptacle portion that extends from a first end of the built-in chip portion and defines an optical path; wherein the built-in chip portion and the receptacle portion are attached to each other;
a board electrically connected to a second end of the built-in chip portion that is opposite to the first end of the built-in chip portion;
a housing that houses the optical subassembly and the board; and
a holding member that comprises a front rib comprising a groove into which the receptacle portion is fitted, a back rib to which the board is secured, and a side rib that links the front rib and the back rib;
wherein the holding member includes a bottom face that includes an aperture;
wherein the optical subassembly and the board are securely fixed to the holding member, and
wherein the housing comprises a front restriction portion to restrict a forward movement of the front rib in a direction of an axis of the optical path, and a back restriction portion to restrict a backward movement of the back rib in the direction of the axis of the optical path.

6. The optical transceiver according to claim 5, wherein:
the housing further comprises a heat radiation sheet disposed on a predetermined inside face of the housing, the optical subassembly comprises a predetermined face that is at the same level as the bottom face of the holding member or protrudes through the aperture of the bottom face of the holding member, and the predetermined face of the optical subassembly is in contact with the heat radiation sheet.

7. The optical transceiver according to claim 6, wherein:

the housing further comprises a stopper to prevent the optical subassembly from shifting in excess of a predetermined distance.

8. The optical transceiver according to claim 5, further comprising:

a shield member that is disposed between the front restriction portion of the housing and the front rib of the holding member, wherein the shield member comprises an elastic material.

9. An optical transceiver, comprising:

an optical subassembly that comprises:
   (i) a built-in chip portion that comprises a chip for light transmission and reception; and
   (ii) a receptacle portion that extends from a first end of the built-in chip portion and defines an optical path; wherein the built-in chip portion and the receptacle portion are attached to each other;

a board electrically connected to a second end of the built-in chip portion that is opposite to the first end of the built-in chip portion;

a housing that houses the optical subassembly and the board; and a holding member that comprises a front rib comprising a groove into which the receptacle portion is fitted, a back rib to which the board is secured, and a side rib that links the front rib and the back rib;

wherein the holding member includes a bottom face that includes an aperture, wherein the optical subassembly and the board are securely fixed to the holding member, wherein the housing further comprises a heat radiation sheet disposed on a predetermined inside face of the housing, wherein the optical subassembly comprises a predetermined face that is at the same level as the bottom face of the holding member or protrudes through the aperture of the bottom face of the holding member, and wherein the predetermined face of the optical subassembly is in contact with the heat radiation sheet.

10. The optical transceiver according to claim 9, wherein:

the housing further comprises a stopper to prevent the optical subassembly from shifting in excess of a predetermined distance.

11. An optical transceiver, comprising:

an optical subassembly that comprises:
   (i) a built-in chip portion that comprises a chip for light transmission and reception; and
   (ii) a receptacle portion that extends from a first end of the built-in chip portion and defines an optical path; wherein the built-in chip portion and the receptacle portion are attached to each other;

a board electrically connected to a second end of the built-in chip portion that is opposite to the first end of the built-in chip portion;

a housing that houses the optical subassembly and the board; and a holding member that comprises a front rib comprising a groove into which the receptacle portion is fitted, a back rib to which the board is secured, and a side rib that links the front rib and the back rib;

wherein the holding member holds the optical subassembly;

wherein the housing further comprises a heat radiation sheet disposed on a predetermined inside face of the housing;

wherein the optical subassembly comprises a predetermined face that is at the same level as an outside face of the holding member or protrudes from the outside face of the holding member;

wherein the predetermined face of the optical subassembly is in contact with the heat radiation sheet;

wherein the optical subassembly is connected through a lead to the board, and wherein the lead has a shift quantity of ±0.1 mm or less in a direction of a thickness of the heat radiation sheet between a reference position of the lead expected when the optical subassembly is at a reference position and a position of the lead in a mounted state where the optical subassembly, the board and the holding member are mounted on the housing; and wherein the reference position of the optical subassembly is defined as a position where the optical subassembly is targeted to sit after being mounted and after being shifted by a predetermined distance in a direction that the heat radiation sheet is compressed from its original thickness.

12. An optical transceiver, comprising:

an optical subassembly that comprises a built-in chip portion and a receptacle portion;

a board electrically connected via a lead at an end of the board to one end of the built-in chip portion;

a housing that houses the optical subassembly and the board, wherein the housing comprises a bottom plate, wherein the housing is provided with passages through which an optical fiber connector is inserted; and a holding member to hold the optical subassembly, wherein the holding member is disposed separately on the bottom plate of the housing; and wherein the holding member accommodates and fixes the optical subassembly; and wherein the board and a back rib of the holding member are securely fixed to each other by a fixing member in a vicinity of the end of the board connected to the lead.

13. The optical transceiver according to claim 12, wherein:

the holding member includes a bottom face that includes an aperture.

14. An optical transceiver, comprising:

an optical subassembly that comprises a built-in chip portion and a receptacle portion;

a board electrically connected to one end of the built-in chip portion;

a housing that houses the optical subassembly and the board, wherein the housing comprises a bottom plate; and a holding member to hold the optical subassembly, wherein the holding member is disposed separately on the bottom plate of the housing;

wherein the optical subassembly and the board are securely fixed to the holding member, wherein the holding member comprises a front rib comprising a groove into which the receptacle portion is fitted and a back rib to which the board is secured, and wherein the housing comprises a front restriction portion to restrict a forward movement of the front rib in a longitudinal direction of the optical transceiver and a back restriction portion to restrict a backward movement of the back rib in the longitudinal direction of the optical transceiver.

15. A method for assembling an optical transceiver, comprising the steps of:
- integrating a built-in chip portion that comprises a chip for light transmission and reception and a receptacle portion that defines an optical path into an optical subassembly;
- securely fixing the optical subassembly to a holding member, wherein the holding member comprises a front rib, a back rib, and a side rib that links the front rib and the back rib to accommodate the optical subassembly;
- securely fixing a board to the back rib of the holding member by a fixing member in a vicinity of an end of the board;
- electrically connecting the optical subassembly to the board via a lead at the end of the board attached by the fixing member; and
- attaching the optical subassembly, holding member, and board inside a housing, wherein said housing comprises a top plate, a side plate, and a bottom plate, wherein the housing is provided with passages through which an optical fiber connector is inserted.

16. The method according to claim 15, wherein the step of securely fixing the board to the back rib of the holding member comprises the step of disposing the board on the back rib of the holding member and securing the board to the back rib with a screw.

17. The method according to claim 15, wherein the step of electrically connecting the optical subassembly to the board comprises soldering the lead protruding from the optical subassembly to the board.

18. The method according to claim 15, further comprising the step of: disposing a heat radiation sheet on the bottom plate of the housing, wherein the heat radiation sheet is disposed between the bottom plate of the housing and a bottom surface of the holding member.

19. A method for assembling an optical transceiver, comprising the steps of:
- integrating a built-in chip portion that comprises a chip for light transmission and reception and a receptacle portion that defines an optical path into an optical subassembly;
- securely fixing the optical subassembly to a holding member, wherein the holding member comprises a front rib, a back rib, and a side rib that links the front rib and the back rib;
- securely fixing a board to the back rib of the holding member; and
- attaching the optical subassembly, holding member, and board inside a housing, wherein said housing comprises a top plate, a side plate, and a bottom plate;
- wherein the top plate of the housing comprises a bottom side; and
- wherein the step of attaching comprises the step of attaching the optical subassembly to the bottom side of the top plate of the housing.

20. The method according to claim 19, wherein the step of attaching further comprises the step of:
- closing up the optical subassembly and holding member within the housing by attaching the bottom plate of the housing to the top plate of the housing.

21. A method for assembling an optical transceiver, comprising the steps of:
- integrating a built-in chip portion that comprises a chip for light transmission and reception and a receptacle portion that defines an optical path into an optical subassembly;
- securely fixing the optical subassembly to a holding member, wherein the holding member comprises a front rib, a back rib, and a side rib that links the front rib and the back rib;
- securely fixing a board to the back rib of the holding member; and
- attaching the optical subassembly, holding member, and board inside a housing, wherein said housing comprises a top plate, a side plate, and a bottom plate;
- wherein the step of securely fixing the optical subassembly to a holding member comprises the steps of:
- fitting the receptacle portion into a bottom half of the front rib; and
- laying a top half of the front rib onto the bottom half of the front rib wherein the optical subassembly is held by the holding member.

* * * * *